United States Patent [19]

Sasa

[11] Patent Number: 5,020,645
[45] Date of Patent: Jun. 4, 1991

[54] VEHICLE CLUTCH CONTROL SYSTEM

[75] Inventor: Yuki Sasa, Tokyo, Japan
[73] Assignee: Isuzu Motors Limited, Tokyo, Japan
[21] Appl. No.: 439,330
[22] Filed: Nov. 21, 1989

[30] Foreign Application Priority Data

Dec. 20, 1988 [JP] Japan ............................. 321532

[51] Int. Cl.⁵ ........................................... B60K 41/28
[52] U.S. Cl. .............................. 192/0.09; 192/3.63
[58] Field of Search ............ 192/0.09, 0.094, 0.044, 192/4 C, 0.082, 3.63; 364/424.1, 426.01

[56] References Cited

U.S. PATENT DOCUMENTS

| | | |
|---|---|---|
| 4,732,248 | 3/1988 | Yoshimura et al. ............ 192/0.094 |
| 4,778,038 | 10/1988 | Ohkawa et al. ............... 192/0.044 |
| 4,804,074 | 2/1989 | Kiro ............................ 192/0.044 |
| 4,821,854 | 4/1989 | Koshizawa .................... 192/0.094 |
| 4,842,113 | 6/1989 | Lutz ............................ 192/0.094 |

Primary Examiner—Allan D. Herrmann
Assistant Examiner—Andrea Pitts
Attorney, Agent, or Firm—Staas & Halsey

[57] ABSTRACT

A system for controlling the clutch of an automotive vehicle includes clutch engagement amount deciding means for deciding an amount of clutch engagement based on the braking force applied by a brake device. A clutch actuator is controlled based on the amount of clutch engagement decided by the deciding means, so that the vehicle can be made to travel at very low velocity merely by operating a brake pedal.

13 Claims, 6 Drawing Sheets

VEHICLE CLUTCH CONTROL SYSTEM

BACKGROUND OF THE INVENTION

This invention relates to a control system for a clutch disposed between an engine and a transmission mounted on an automotive vehicle.

In order to facilitate the driving of automotive vehicles, automatic transmissions have been developed and put into use in which a conventional friction clutch or counter-shaft gear-type transmission is utilized and engagement/disengagement of the friction clutch or a speed change in the transmission is controlled by an electronic control unit using a microcomputer.

A control system which decides a target position of an amount of clutch engagement in an automatic transmission using such an electronic control unit has been disclosed in the specification of Japanese Patent Application Laid-Open (KOKAI) No. 63-61644 and includes a load sensor for sensing engine throttle opening, an engine rotation sensor for sensing the rotational speed (rpm) of the engine, an input shaft rotation sensor for sensing the rotational speed of the input shaft of a transmission, and a clutch actuator which controls the engagement of a friction clutch, wherein maps associated with these three sensors are retrieved based on signals from the sensors serving as information indicative of the vehicle load, the corresponding amount of clutch engagement is obtained and the clutch actuator is driven accordingly.

When a vehicle equipped with an automatic transmission for controlling a disk clutch in accordance with the foregoing proposal is parked in a lot or at a curb, the friction clutch will not grip. For this reason, the vehicle is controlled at very low velocity by stepping down on the accelerator pedal and foot brake in very small amounts. When a load is carried in and out by a truck or the like, it is necessary for the truck to make small movements on the order of several centimeters relative to a loading platform. In such case the driver must quickly alternate between the accelerator pedal and brake pedal. If there is a delay in switching from one pedal to the other, the vehicle may contact the platform or some obstruction and sustain damage.

SUMMARY OF THE INVENTION

An object of the present invention is to provide a vehicle clutch control system with which an automotive vehicle can be made to travel easily and smoothly at very low velocity by manipulating solely a brake pedal.

In accordance with the present invention, the foregoing object is attained by providing a vehicle clutch control system having an engine mounted in a vehicle, a transmission, a clutch disposed between the engine and the transmission, and a brake device for causing a braking force to act upon wheels of the vehicle, the system comprising a clutch actuator for engaging and disengaging the clutch, means for detecting the braking force of a braking operation, clutch engagement deciding means for deciding an amount of clutch engagement based on the braking force of the brake device, and means for controlling the clutch actuator based on the amount of clutch engagement decided by the clutch engagement deciding means.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of a clutch control system for an automotive vehicle having an internal combustion engine in accordance with the present invention will now be described in detail with reference to the drawings.

Figure 1:
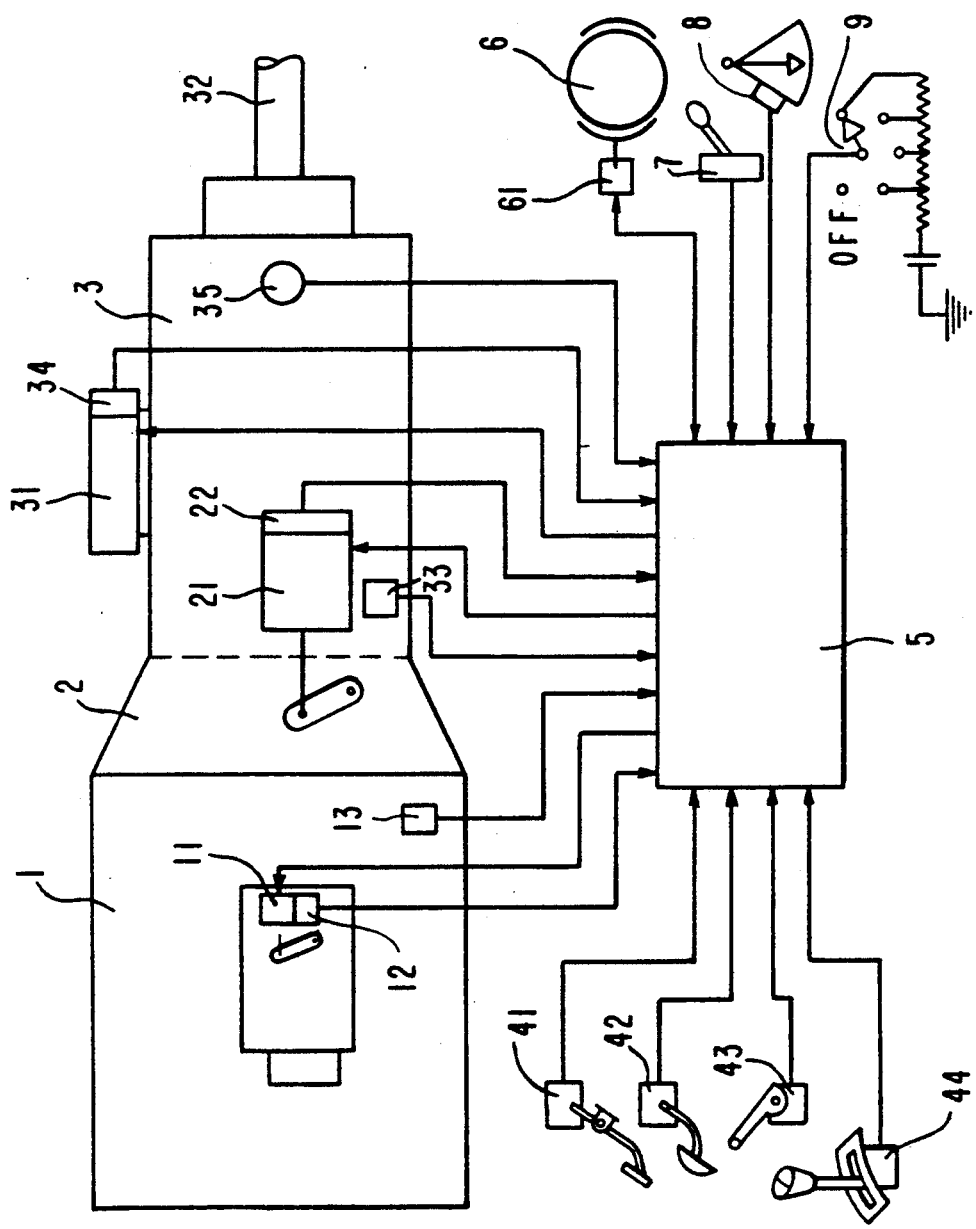
FIG. 1 a schematic diagram showing an embodiment of a vehicle clutch control system according to the present invention.

FIG. 1 is a schematic diagram showing an embodiment of a vehicle clutch control system according to the present invention.

In FIG. 1, numeral 1 denotes an internal combustion engine mounted in an automotive vehicle for burning fuel to produce a driving force by the combustion energy. Numeral 11 denotes an engine actuator for actuating a fuel injection pump or throttle valve serving as means for supplying fuel to the engine 1. Numeral 12 denotes a throttle opening sensor for sensing the actuation position of the engine actuator 11, and 13 an engine rotation sensor for sensing the rotational speed of the engine 1. These sensors supply their output signals to a controller 5, described below.

Numeral 2 denotes a friction clutch, such as a dry-type, single-disk clutch, which transmits the driving torque of the engine to a transmission 3. Engagement-/disengagement of the clutch for transmitting and interrupting the driving torque is controlled by a clutch actuator 21. Numeral 22 denotes a clutch stroke sensor for sensing the engaging state of the clutch 2 by sensing the actuation position of the clutch actuator 21. The output of the clutch stroke sensor 22 is delivered to the controller 5.

The transmission 3 is constituted by a counter-shaft gear-type transmission and is adapted to apply shift control to each gear stage by a shift actuator 31. Numeral 33 denotes an input shaft rotation sensor for sensing the rotational speed of the input shaft of the transmission 3, 35 a vehicle velocity sensor for sensing the rotational speed of an output shaft 32 of the transmission 3, and 34 a gear stage sensor attached to the shift actuator 31 for sensing the gear stage of the transmission 3. The outputs of these sensors are delivered to the controller 5.

Numeral 41 denotes an accelerator sensor for sensing the amount of depression of the accelerator pedal, 42 a brake sensor for sensing the amount of depression of the foot brake, 43 a parking brake switch for sensing operation of the parking brake, and 44 a selection switch for sensing the selection position (e.g., the D range, I, II, III ranges and Reverse range) of a select lever. The outputs of these sensors and switches are applied to the controller 5.

Numeral 6 denotes a brake device for applying braking force to a wheel of the vehicle, and numeral 61 designates a braking force maintaining device (for example, see U.S. Pat. No. 4,618,040) arranged in the hydraulic circuit of the brake device 6. In order for braking force to be maintained when the brake pedal is depressed to actuate the brake device and stop the vehicle, the braking force maintaining device 61 responds to a command from the controller 5 by actuating an electromagnetic check valve arranged in the brake hydraulic circuit. When the accelerator pedal is depressed to propel the vehicle forward and the clutch attains a prescribed state of engagement, the braking force maintaining device 61 responds to a command from the controller 5 by deactuating the electromagnetic check valve to release the braking force. Thus the device 61 is used as means for aiding forward propulsion of the vehicle on an upgrade.

Numeral 7 denotes a load status switch for setting the status of a load carried by the vehicle. The switch 7 is provided at the driver's seat and is changed over by the driver depending upon whether the vehicled is loaded or empty. The switch 7 is connected to an input port on the controller 5.

Numeral 8 denotes a gradient sensor mounted on the vehicle body to detect the slope of the road surface on which the vehicle is traveling. Numeral 9 designates a creep adjusting device mounted at the driver's seat. This device is adjusted by the driver to set a desired creep strength when the vehicle creeps in the half-clutch state. The device can be used also to turn off the creep function. The outputs of the gradient sensor 8 and creep adjusting device 9 are applied to the controller 5. The creep adjusting device 9 can employ a potentiometer-type variable resistor and need not be the multiple-stage switch shown in FIG. 1.

The controller 5 is constituted by a microcomputer and has a central controller for performing processing, various memories for storing processing procedures, control procedures and control maps, described below, and an input/output port. When signals arrive from the aforementioned sensors and switches, the controller 5 sends commands to the associated actuators and the like in accordance with results obtained from the stored procedures, thereby controlling the clutch 2, transmission 3, brake device, etc.

Figure 2A:
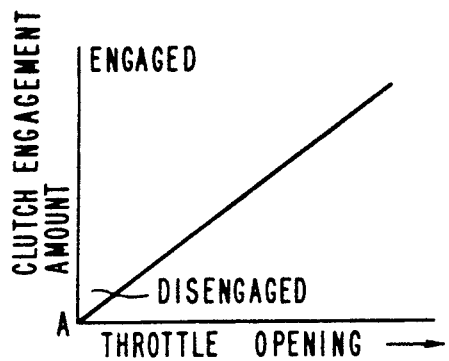
FIGS. 2(a), (b) and (c) are diagrams for describing control maps for setting the amount of engagement of a clutch when an automotive vehicle is traveling in an ordinary manner.
Figure 2B:
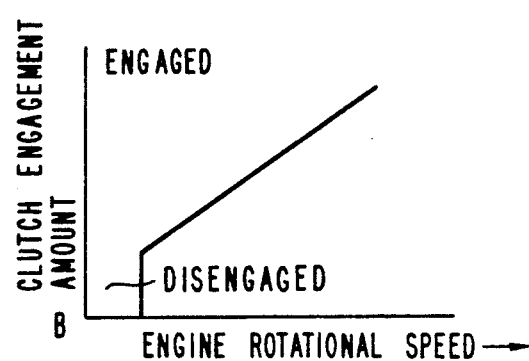
FIGS. 2(d), (e), (f) and (g) are diagrams for describing control maps, which are used in the present invention, for setting the amount of engagement of a clutch when a automotive vehicle is traveling at very low velocity.
Figure 2C:
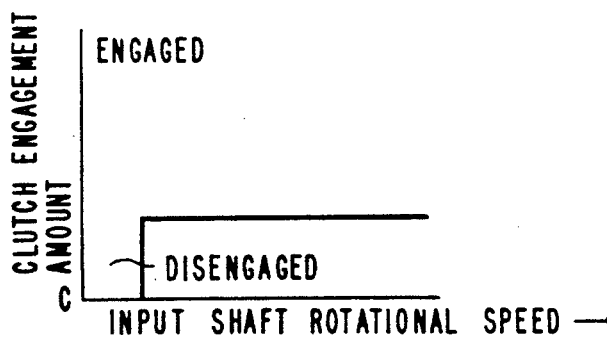
Figure 2D:
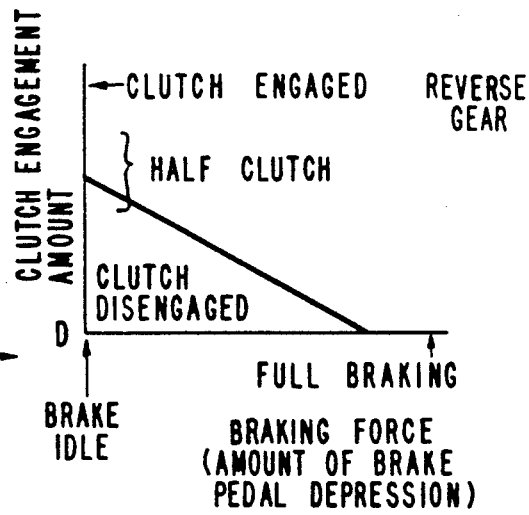
Figure 2E:
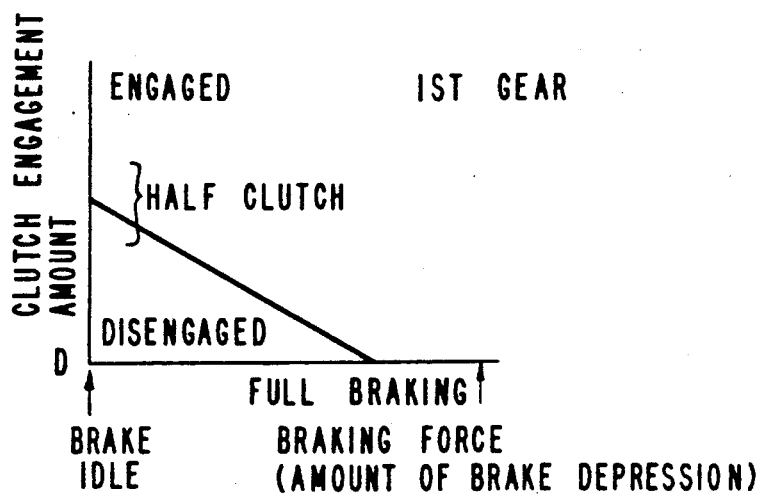

FIGS. 2(a) through (g) show various maps stored in the memory of the controller 5. FIGS. 2(a) through (c) are maps for setting the amount of clutch engagement during ordinary travel of the vehicle, in which (a) is for setting the relation between throttle opening and clutch engagement amount A, (b) is for setting the relation between engine rpm and clutch engagement amount B, and (c) is for setting the relation between input shaft rpm and clutch engagement amount C. FIGS. 2(d) through (g) are maps for vehicle travel at very low velocity. These are for setting the relation between braking force, namely the amount of brake pedal depression, and clutch engagement amount D at each gear speed of the transmission. FIG. 2(d) is for setting clutch engagement amount D in reverse gear, (e) in first gear, (f) in second gear, and (g) in third gear. The map for first gear in FIG. 2(e) is used when the vehicle is in the loaded state or traveling on an upgrade. Clutch engagement starts when the braking force of the brake is high, namely when the brake pedal is returned slightly from the full-stroke position. Driving force also is large owing to the low-speed gear, and the amount of clutch engagement is large in comparison with the second and third gears. There are cases where the map for reverse gear in FIG. 2(d), similar to that described above, also is used in a state where the driving force is large and the vehicle is carrying a load. Accordingly, the clutch starts to be engaged when the brake pedal is returned slightly from the full-stroke position.

Figure 2F:
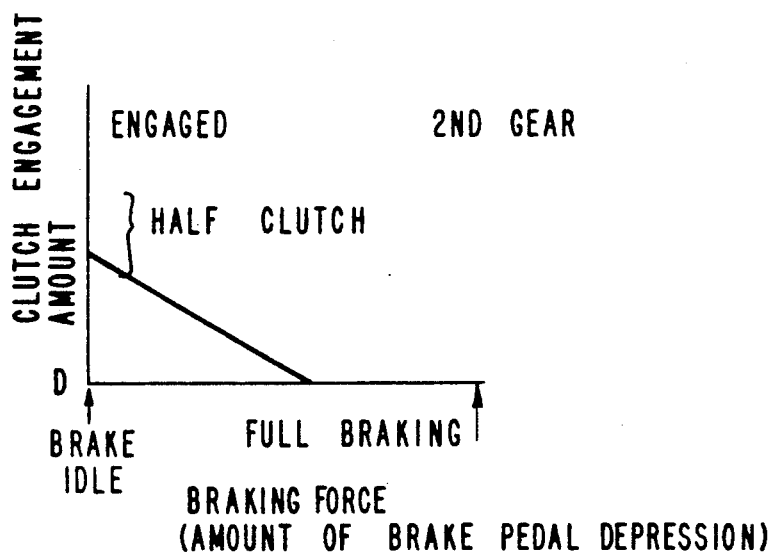
Figure 2G:
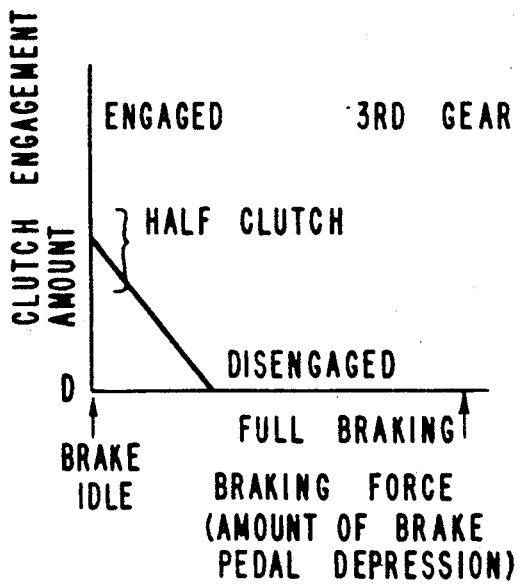

(f) The map for second speed shown in FIG. 2(f) is used on level road surfaces regardless of whether the vehicle is or is not carrying a load. Since a large driving force is unnecessary, the clutch starts to be engaged after the brake pedal is returned a considerable amount. The vehicle creeps forward even when the amount of clutch engagement becomes small. The map for third gear shown in FIG. 2(g) is hardly ever used for parking since speed develops owing to the gear ratio. This map can be employed when the vehicle is traveling unloaded or on a downgrade.

The maps for each of these gear speeds shown in FIGS. 2(d) through (g) are such that driving force differs depending upon each gear ratio. Therefore, since the driving force is smaller for third gear than for first gear, by way of example, the engine will stall or the time for slip between the engine flywheel (drive-shaft side) and clutch-driven plate (driven-side) will be prolonged if the amount of clutch engagement is made large. Consequently, the clutch-driven plate tends to sustain abnormal wear or thermal deformation, and velocity during creep rises in the half-clutch state. In a gear speed where driving force is small, therefore, the amount of clutch engagement is made small.

Figure 3:
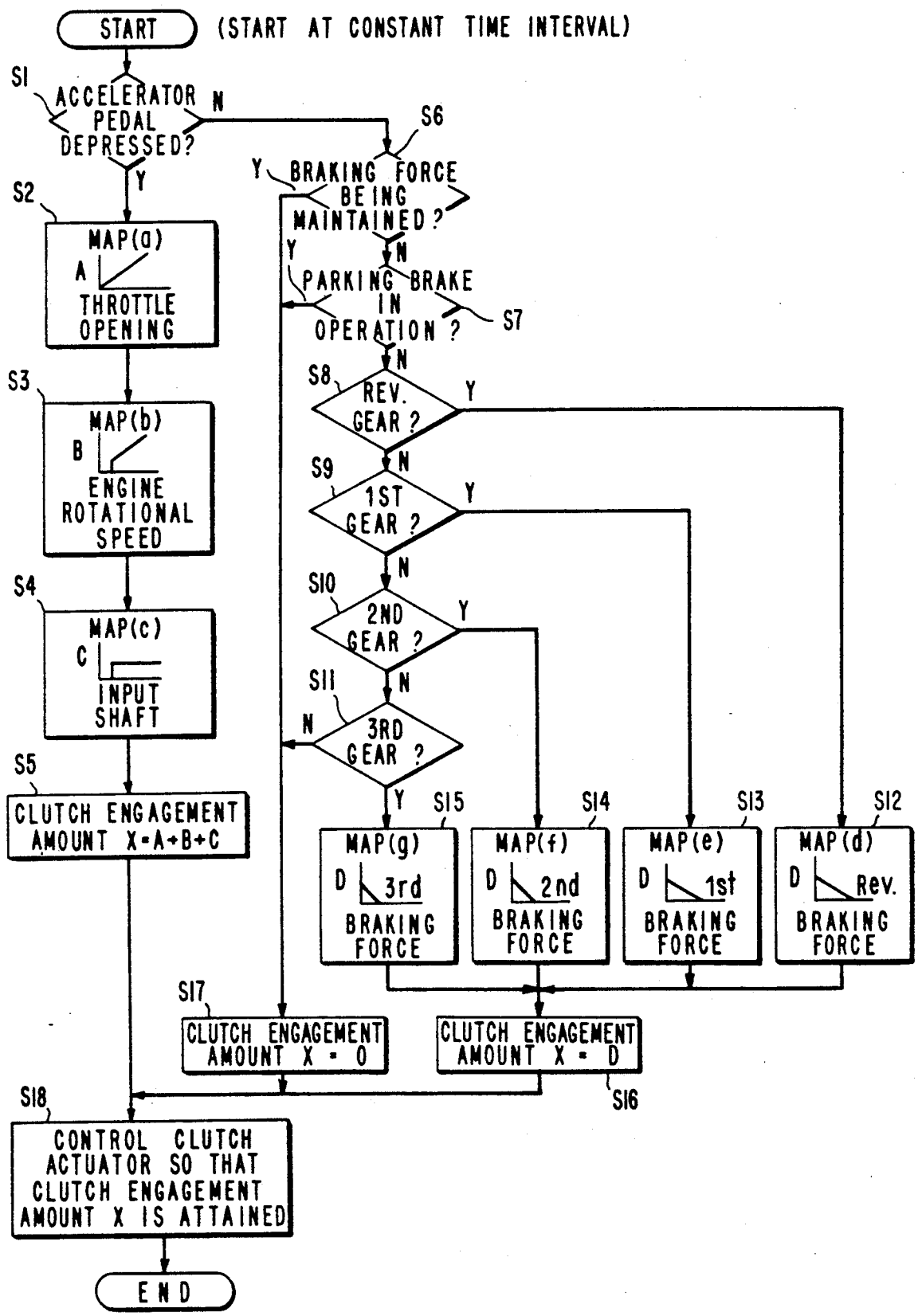
FIG. 3 is a processing flowchart illustrating an example of control performed by the vehicle clutch control system the present invention.

FIG. 3 is a processing flowchart illustrating an example of operation according to the present embodiment. The operation of this embodiment will now be described based on FIG. 3.

First, as step S1, the controller 5 determines, in accordance with a signal from the accelerator sensor 41, whether the accelerator pedal is being depressed. When it is determined that the accelerator pedal is being depressed, this means that the vehicle is traveling in the ordinary manner, and processing proceeds to step S2. Here the controller reads in the throttle opening signal from the throttle opening sensor 12 provided on the engine actuator 11 and determines, by retrieving the map (a) stored in memory, the clutch engagement amount A corresponding to the throttle opening. The program then proceeds to step S3.

At step S3 the controller reads in the rpm signal from the engine rotation sensor 13 and determines, by retrieving the map (b), the clutch engagement amount B corresponding to this rotational speed. At step S4 the controller reads in the rpm signal from the input shaft rotation sensor 33 and determines, by retrieving the map (c), the clutch engagement amount C corresponding to this rotational speed. The program then proceeds to step S5.

The clutch engagement amounts A, B, C obtained respectively at the steps S2, S3, S4 are added at step S5 to compute and decide a clutch engagement amount $X=A+B+C$. Next, the controller 5 proceeds to step S18 to control the clutch actuator 21 in such a manner that the clutch engagement amount X decided at step S5 will be achieved.

If it is decided at step S1 that the accelerator pedal is not being depressed, then the program proceeds to step S6, which is the beginning of flow for controlling travel finely at very low velocity. The controller 5 determines at step S6, based on the signal from the braking force maintaining device 61, whether maintenance of braking force is in effect. If braking is being maintained, the clutch engagement amount D is made zero at step S17. If it is found at step S6 that braking force is not being maintained, then the signal from the parking brake switch 43 is checked at step S7. The program proceeds to step S17 if the parking brake is in operation. If the parking brake is found not to be in operation at step S7, the program proceeds to step S8. Since the setting of the clutch engagement amount D versus braking force differs with each gear speed of the transmission, the gear speed signals from the gear speed sensor 34 are read in.

If the gear speed signal is indicative of reverse (Rev.), the program proceeds from step S8 to step S12, where the map (d) for reverse is retrieved to obtain the clutch engagement amount D corresponding to the braking force from the brake sensor 42. If the gear speed signal is indicative of first gear (1st), then the program proceeds from step S9 to step S13, where the map (e) for first gear is retrieved to obtain the clutch engagement amount D corresponding to the braking force. If the gear speed signal is indicative of second gear (2nd), then the program proceeds from step S10 to step S14, where the map (f) for second gear is retrieved to obtain the clutch engagement amount D corresponding to the braking force. If the gear speed signal is indicative of third gear (3rd), then the program proceeds from step S11 to step S14, where the map (g) for third gear is retrieved to obtain the clutch engagement amount D corresponding to the braking force. Thus, the clutch engagement amount D, which differs depending upon the transmission speed, is obtained.

At step S16, the clutch engagement amount D obtained through steps S12-S15 is decided as the clutch engagement amount X, after which the program proceeds to step S18, where the clutch actuator is controlled in such a manner that the clutch engagement amount S is achieved.

In accordance with this embodiment as set forth above, the arrangement is such that when the vehicle travels at very low velocity, ultra-low velocity control is performed merely by controlling the amount by which the brake pedal is depressed. As a result, driving along a very narrow road, parking and approaching a loading platform can readily be performed through a simple operation.

Further, in accordance with the embodiment, the clutch engagement amount with respect to braking force is set for each and every gear speed. Therefore, since the amount of clutch engagement corresponds to driving force, smooth travel at very low velocity can be achieved and abnormal wear of the clutch-driven plate can be prevented.

Figure 4H:
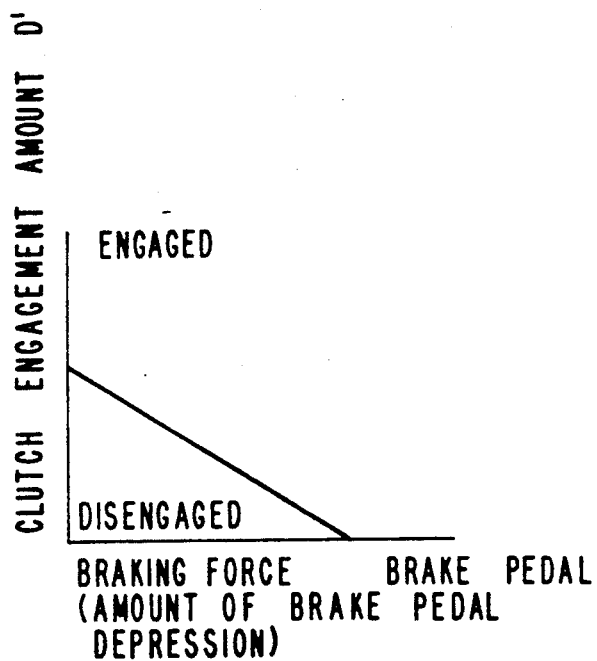
FIG. 4(h) is a diagram for describing another example of a control map, used in the present invention, for setting an amount of clutch engagement when an automotive vehicle is traveling at very low velocity.
Figure 4J:
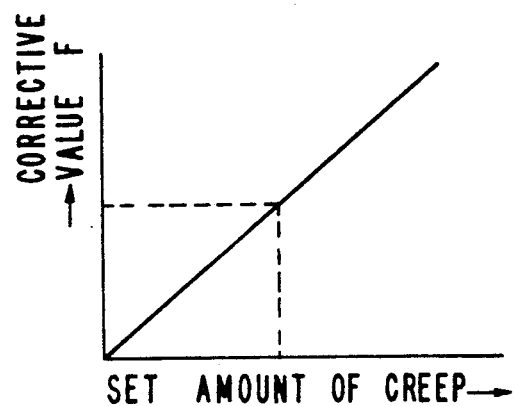
FIGS. 4(i), (j) diagrams for describing control maps for corrective values of the amount of clutch engagement.
Figure 4I:
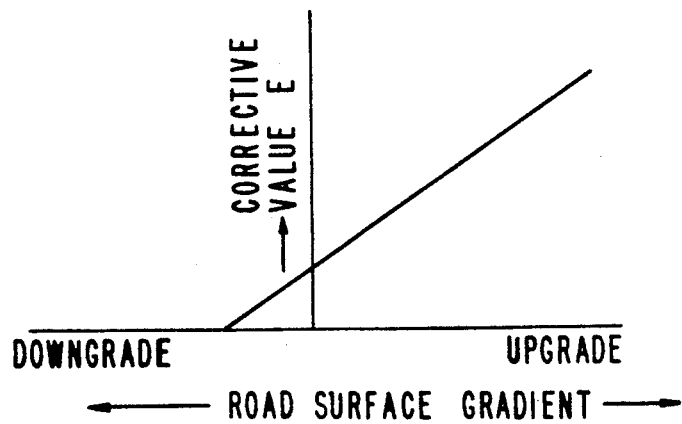

FIG. 4 illustrates maps (h)-(j) used in another embodiment of the present invention, in which (h) is for setting the relation between driving force and a clutch engagement amount D' applies to maps (d) through (g) described earlier, (i) is for setting a corrective value of clutch engagement amount to take road surface gradient into account, and (j) is for setting a corrective value of clutch engagement amount with regard to a creep adjusting device, which is for adjusting creep strength. These maps are stored in the memory of the controller 5.

Figure 5:
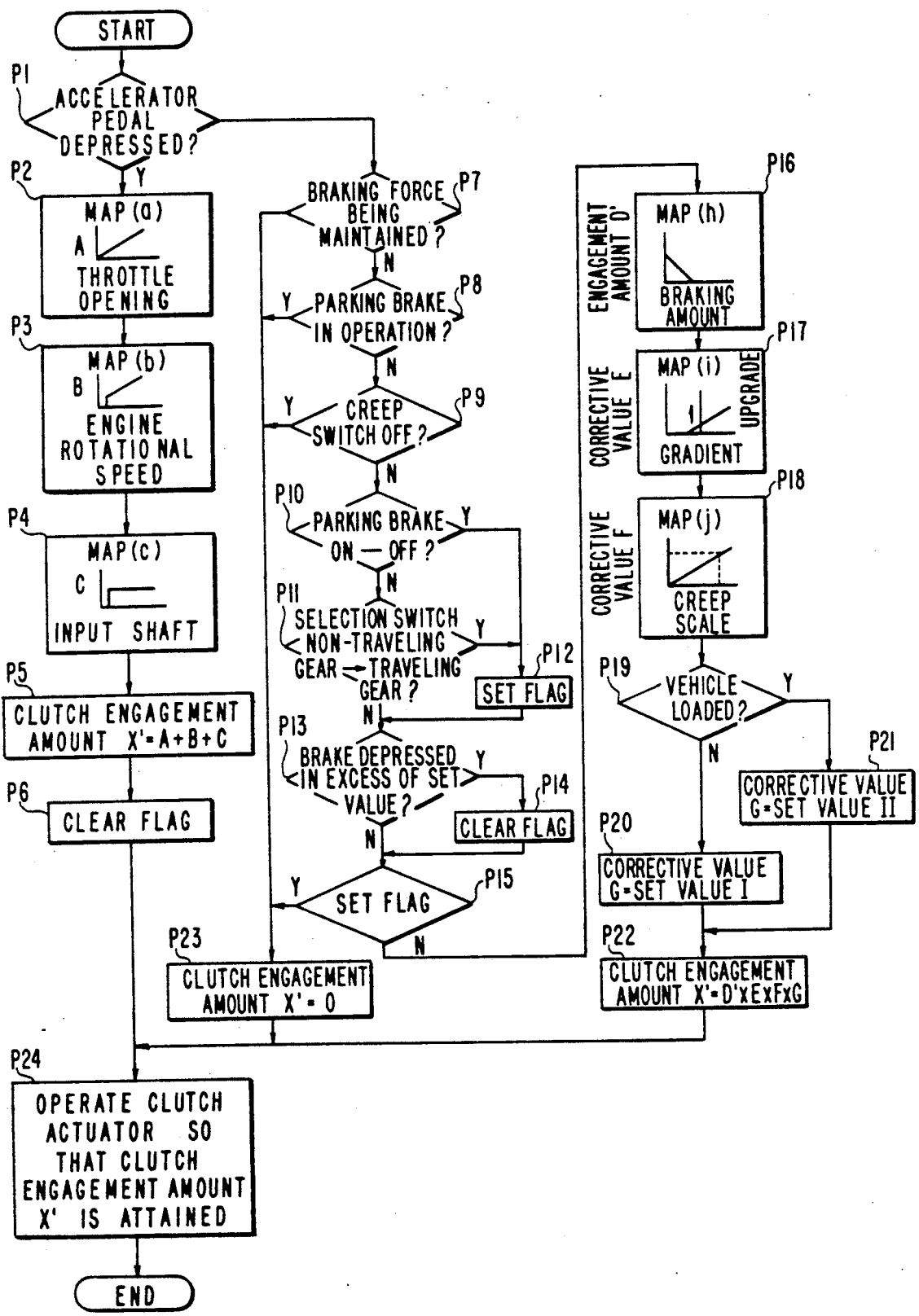
FIG. 5 is a processing flowchart illustrating another example of control performed by the vehicle clutch control system of the present invention.

FIG. 5 is a processing flowchart illustrating another example of operation according to the present embodiment. The operation of this embodiment will now be described based on FIG. 5.

Steps P1 through P5 are for when the vehicle is traveling in an ordinary manner, just as in steps S1 through S5 of FIG. 3. Therefore, in accordance with the signals from the throttle opening sensor 12, engine rotation sensor 13 and input shaft rotation sensor 33, the maps (a) through (c) are retrieved to obtain the clutch engagement amounts A, B, C, and the clutch engagement amount $X'=A+B+C$ is computed and decided.

Next, at step P6, a flag is cleared if the flag has been set, and the program proceeds to step P24. The clutch actuator controlled in such a manner that the clutch engagement amount X' decided at step P5 is achieved.

If it is determined at step P1 that the accelerator pedal is not being depressed, then the program proceeds to step P7, which is the beginning of flow for controlling travel finely at very low velocity. The controller 5 determines at step P7, based on the status of the braking force maintaining device 61, whether maintenance of braking force is in effect. If braking force is not being maintained, the parking brake is found not to be in operation at step P8 and the creep adjusting device 9 is found at step P9 not to be set in the off position, then parking brake switch is checked at step P10. When YES answer is received at step P7, P8 or P9, the program proceeds to step P23, where the clutch engagement amount D' is made zero.

The program proceeds to step P12 when the parking brake is found to be released at step P10 based on a signal from the parking brake switch 43, or when it is found at step P11, based on a signal from the selection switch 44, that the transmission gear speed is changed from neutral (a gear at which no travel takes place) to a travel gear. At step P12, a flag prohibiting creep (half clutch) at the time of brake release is controlled and set (to inhibit creep). The reason for this is that when the parking brake is suddenly released or the select lever operated, the controller cannot determine whether the driver wishes to begin traveling immediately or is a preparing to do so. Thus, this step prevents the vehicle from lurching forward unexpectedly.

If NO answers are obtained at both steps P10 and P11, or after the flag has been set at step P12, the program proceeds to step P13, at which the controller checks the amount of brake pedal depression based on the signal from the brake sensor 42. If the braking force (the amount of brake pedal depression) does not exceed a set value (i.e., if the braking force is insufficient), the program proceeds to step P15. If the brake pedal is found to be pressed sufficiently at step P13, the flag is cleared at step P14 (creep is allowed) and the program proceeds to step P15.

It is determined at this step whether the flag has been set. If the flag has been set, the program proceeds to step P23 to make the clutch engagement amount D' zero. If the flag has not been set, the program proceeds to the flow from step P16 onward.

The signal from the brake sensor 42 is read in and the map of FIG 4 (h) is retrieved at step P16 to obtain the clutch engagement amount D'. This is followed by step P17, at which the signal from the gradient sensor 8 is read in and the map (i) retrieved to obtain a corrective value E of clutch engagement amount with respect to road surface slope. Then, at step P18, the signal from the creep adjusting device 9 is read in and the map (j) is retrieved to obtain a corrective value F of clutch engagement amount with respect to the set amount of creep.

Next, at step P19, the signal from the load status switch 7 is checked. If the vehicle is not carrying a load, a corrective value G of the clutch engagement amount is made a preset value I. If the vehicle is carrying a load, the corrective value G is made a set value II (steps P20, P21).

This is followed by step P22, at which a clutch engagement amount $X' = A + B + C + D' \times E \times F \times G$ is obtained from the clutch engagement amount D obtained at step P16 and the corrective values E, F and G obtained at steps P17, P18 and P19.

The clutch actuator 21 is controlled so as to achieve the obtained clutch engagement amount X', and the vehicle is made to travel at very low velocity in the half-clutch state.

In accordance with the present embodiment as set forth above, travel at very low velocity can be achieved with ease merely by controlling the amount of brake pedal depression, and the amount of clutch engagement can be corrected in dependence upon the state of the road surface on which the vehicle is situated, the desired amount of adjustment set by the creep adjusting device, and the state of the vehicle load. This makes smooth travel at very low velocities possible.

As many apparently widely different embodiments of the present invention can be made without departing from the spirit and scope thereof, it is to be understood that the invention is not limited to the specific embodiments thereof except as defined in the appended claims.

What is claimed is:

1. A vehicle clutch control system having an engine mounted in an automotive vehicle, a transmission, a clutch disposed between the engine and the transmission, an accelerator pedal for controlling fuel to be supplied to the engine, a brake device for causing a braking force to act upon wheels of the vehicle, and a parking brake, the system comprising:

a clutch actuator for engaging and disengaging said clutch;
   means for detecting the amount of depression of said accelerator pedal;
   means for sensing operation of said parking brake;
   means for detecting the braking force applied by braking operation of said brake device;
   clutch engagement deciding means for deciding an amount of clutch engagement based on the braking force applied by said brake device, said amount of clutch engagement being smaller as the braking force is greater and being gradually greater up to a partly clutch engaging region as the braking force is smaller; and
   means for controlling said clutch actuator based on the amount of clutch engagement decided by said clutch engagement deciding means when the amount of depression of the accelerator pedal is zero and parking brake is not applied.

2. The control system according to claim 1, further comprising gear speed detecting means for detecting an operating gear speed of the transmission, wherein said clutch engagement amount deciding means has control maps for setting a clutch engagement amount corresponding to a braking force for each gear speed, with the clutch engagement amount being set based on a control map of a gear speed detected by said gear speed detecting means.

3. The control system according to claim 1, further comprising road gradient detecting means for detecting a gradient of a road surface on which the vehicle is situated, wherein said clutch engagement amount deciding means has means for setting a corrective value corresponding to the gradient of the road surface, with a clutch engagement amount set based on braking force being corrected by a corrective value corresponding to the road surface gradient detected by said road gradient detecting means.

4. The control system according to claim 1, further comprising creep adjusting means for adjusting amount of creep, wherein said clutch engagement amount deciding means has means for setting a corrective value corresponding to a set creep amount, with a clutch engagement amount set based on braking force being corrected by a corrective value corresponding to a signal from said creep adjusting means.

5. The control system according to claim 1, further comprising load status setting means for setting the status of a load on the vehicle, wherein said clutch engagement amount deciding means has means for setting a corrective value corresponding to the status of a load, with a clutch engagement amount set based on braking force being corrected by a corrective value corresponding to a signal from said load status setting means.

6. A vehicle clutch control system having an engine mounted in automotive vehicle, a transmission, a clutch disposed between the engine and the transmission, an accelerator pedal for controlling fuel to be supplied to the engine, a brake device for causing a braking force to act upon wheels of the vehicle, and a braking force maintaining device for maintaining the braking force caused to act upon the wheels by the brake device, and a parking brake, the system comprising:

a clutch actuator for engaging and disengaging said clutch;
   means for detecting the amount of depression of said accelerator pedal;
   means for sensing operation of said parking brake
   means for detecting the braking force applied by braking operation of said brake device;
   clutch engagement deciding means for deciding an amount of clutch engagement based on the braking force applied by said brake device, said amount of clutch engagement being smaller as the braking force is greater and being gradually greater up to a partly clutch engaging region as the braking force is smaller; and
   means for controlling said clutch actuator based on the amount of clutch engagement decided by said clutch engagement deciding means when the amount of depression of the accelerator pedal is zero and the parking brake is not applied.

7. The control system according to claim 6, further comprising gear speed detecting means for detecting an operating gear speed of the transmission, wherein said clutch engagement amount deciding means has control maps for setting a clutch engagement amount corresponding to a braking force for each gear speed, with the clutch engagement amount being set based on a control map of a gear speed detected by said gear speed detecting means.

8. The control systems according to claim 7, further comprising road gradient detecting means for detecting the gradient of a road surface on which the vehicle is situated, wherein said clutch engagement amount deciding means has means for setting a corrective value corresponding to a gradient of the road surface, with a clutch engagement amount set based on braking force being corrected by a corrective value corresponding to the road surface gradient detected by said road gradient detecting means.

9. The control systems according to claim 6, further comprising creep adjusting means for adjusting amount of creep, wherein said clutch engagement amount deciding means has means for setting a corrective value corresponding to a set creep amount, with a clutch engagement amount set based on braking force being corrected by a corrective value corresponding to a signal from said creep adjusting means.

10. The control system according to claim 6, further comprising load status setting means for setting the status of a load on the vehicle, wherein said clutch engagement amount deciding means has means for setting a corrective value corresponding to the status of a load, with a clutch engagement amount set based on braking force being corrected by a corrective value corresponding to a signal from said load status setting means.

11. A vehicle clutch control system having an engine mounted in an automotive vehicle, a transmission, a clutch disposed between the engine and the transmission, and a brake device for causing a braking force to act upon wheels of the vehicle during a braking operation, the system comprising:
  a clutch actuator for engaging and disengaging said clutch;
  means for detecting the braking force applied by said braking operation;
  clutch engagement deciding means for deciding an amount of clutch engagement based on the braking force applied by said brake device;
  means for controlling said clutch actuator based on the amount of clutch engagement decided by said clutch engagement deciding means; and
  road gradient detecting means for detecting a gradient of a road surface on which the vehicle is situated, wherein said clutch engagement deciding means has means for setting a corrective value corresponding to the gradient of the road surface, with a clutch engagement amount set based on braking force being corrected by a corrective value corresponding to the road surface gradient detected by said road gradient detecting means.

12. A vehicle clutch control system having an engine mounted in an automotive vehicle, a transmission, a clutch disposed between the engine and the transmission, and a brake device for causing a braking force to act upon wheels of the vehicle during a braking operation, the system comprising:
  a clutch actuator for engaging and disengaging said clutch;
  means for detecting the braking force applied by said braking operation;
  clutch engagement deciding means for deciding an amount of clutch engagement based on the braking force applied by said brake device;
  means for controlling said clutch actuator based on the amount of clutch engagement decided by said clutch engagement deciding means; and
  said clutch engagement amount deciding means has means for setting a corrective value corresponding to a st creep amount, with a clutch engagement amount set based on braking force being corrected by a corrective value corresponding to a signal from said creep adjusting means.

13. A vehicle clutch control system having an engine mounted in an automotive vehicle, a transmission, a clutch disposed between the engine and the transmission, and a brake device for causing a braking force to act upon wheels of the vehicle during a braking operation, the system comprising:
  a clutch actuator for engaging and disengaging said clutch;
  means for detecting the braking force applied by said braking operation;
  clutch engagement deciding means for deciding an amount of clutch engagement based on the braking force applied by said brake device;
  means for controlling said clutch actuator based on the amount of clutch engagement decided by said clutch engagement deciding means; and
  said clutch engagement deciding means has means for setting a corrective value corresponding to the status of a load, with a clutch engagement amount set based on braking force being corrected by a corrective value corresponding to a signal from said load status setting means.

* * * * *